United States Patent [19]

Kehret et al.

[11] Patent Number: 4,993,641

[45] Date of Patent: Feb. 19, 1991

[54] GAS TURBINE SPHERICAL EXHAUST NOZZLE

[75] Inventors: Debora F. Kehret, Jupiter; Edward B. Thayer, Palm Beach Gardens, both of Fla.

[73] Assignee: United Technologies Corporation, Hartford, Conn.

[21] Appl. No.: 427,054

[22] Filed: Oct. 26, 1989

[51] Int. Cl.⁵ .............................................. F02K 1/12
[52] U.S. Cl. ........................... 239/127.3; 239/265.35; 239/265.37; 60/232
[58] Field of Search ............ 239/127.1, 127.3, 265.19, 239/265.33, 265.35, 265.37, 265.39, 265.41; 60/228, 230, 232, 39.83

[56] References Cited

U.S. PATENT DOCUMENTS

| | | | |
|---|---|---|---|
| 4,363,445 | 12/1982 | Bouiller et al. | 239/265.35 |
| 4,544,098 | 10/1985 | Warburton | 239/127.3 |
| 4,801,087 | 1/1989 | Woodard | 239/265.19 |
| 4,836,451 | 6/1989 | Herrick et al. | 60/232 |
| 4,848,664 | 7/1989 | Thayer | 239/265.35 |
| 4,878,617 | 11/1989 | Novotny | 239/265.35 |

Primary Examiner—Andres Kashnikow
Assistant Examiner—Karen B. Merritt
Attorney, Agent, or Firm—Russell M. Lipes, Jr.

[57] ABSTRACT

A spherical exhaust nozzle for a gas turbine engine having gimbal mounted convergent-divergent flaps in which cooling air for the flaps is ducted through the convergent flap pivots and the convergent flaps are actuated by actuators connected to the gimbal structure.

7 Claims, 6 Drawing Sheets

GAS TURBINE SPHERICAL EXHAUST NOZZLE

FIELD OF INVENTION

The present invention relates to a spherical exhaust nozzle for a gas turbine engine and more particularly to the cooling and actuation of the flaps used to vary nozzle area.

BACKGROUND ART

The use of spherical exhaust nozzle in high performance gas turbine engine powered aircraft is known. Such nozzles are provided with movable elements to selectably control nozzle area and also change the direction of the engine exhaust gases. Such an exhaust nozzle is shown in U.S. Pat. No. 4,836,451.

In current designs of spherical exhaust nozzles, cooling air flows between the fixed spherical structure and the movable convergent flaps before entering the upstream end of the flap. Since the flaps are mounted on a gimbal to afford thrust vectoring as well as nozzle area control, construction requires a complicated seal system to contain the cooling air. Also, when the nozzle throat area increases from dry power to maximum afterburning, the volume of the gas passage increases, temporarily cutting off cooling airflow to the convergent and the divergent flaps. In addition, the convergent flaps are actuated through concentric shafts located at their pivots. This induces a large torque load on the smallest part of the convergent flap structure.

DISCLOSURE OF INVENTION

According to the invention, an improved cooling air supply system and flap actuator arrangement are provided for a gas turbine engine spherical exhaust nozzle.

The foregoing and other features and advantages of the present invention will become more apparent from the following description and accompanying drawings.

BEST MODE FOR CARRYING OUT THE INVENTION

Figure 1:
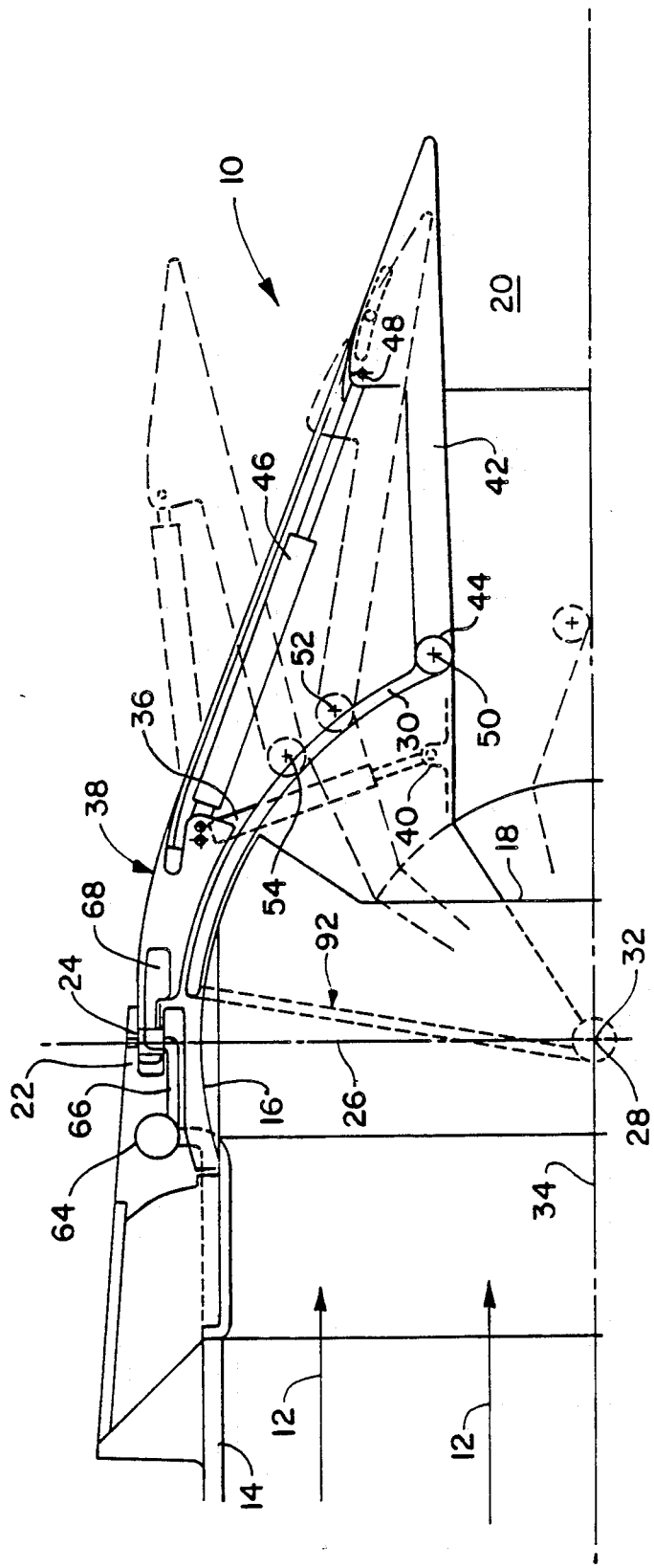
FIG. 1 is a cross-section of a spherical exhaust nozzle according to the invention in a vertical plane.

FIG. 1 shows a schematic cross-section taken in a vertical plane of a gas turbine engine spherical exhaust nozzle 10. The nozzle receives pressurized exhaust gases 12 from the engine, not shown, after the gases pass through afterburner liner 14. The liner terminates in collar 16 having a generally spherical external surface. The collar has rearwardly facing opening 18 for the discharge of exhaust gases into nozzle outlet 20. Nozzle 10 further includes gimbal ring 22 surrounding collar 16 which includes two opposed gimbal pivots or bearings, the upper one of which is shown at 24. The pivots support the gimbal ring relative to the nozzle structure and permit relative rotational movement of the ring to achieve yaw control.

The gimbal pivots lie along an axis 26 in the vertical plane which passes through center point 28 defined by the spherical surface of collar 16. Gimbal ring 22 supports upper and lower converging flaps, only upper flap 30 being shown, which are independently pivotable about common axis 32 perpendicular to and on gimbal axis 26 as well as nozzle center line 34. Both gimbal pivot axis 26 and converging flap pivot axis 32 pass through center point 28.

The converging flaps are independently pivotable to achieve a varying nozzle throat area. The position of the flaps is controlled by actuators connected to the gimbal structure and this is one of the features of this invention. Previously, the convergent flaps have been actuated through concentric shafts located at pivot axis 32. Actuator 36 for upper converging flap 30 is shown. The actuator is connected at one end to gimbal structure 38 near the top of gimbal ring 22 and at the other end to boss 40 on the outboard surface of flap 30.

Diverging flaps are pivotably connected by linear hinges to the throat lips of the converging flaps and their position is independently controlled by actuators also connected to the gimbal structure to achieve along with the converging flaps a desired nozzle configuration. Upper diverging flap 42 is pivotably connected at 44 to convergent flap 30, and actuator 46 is connected at one end to gimbal structure 38 and at its other end to the downstream end of the divergent flap at 48. Where the convergent and divergent flaps are in the position shown with the pivoted connection at position 50, the flaps are in the sea level dry power position. When the convergent flaps have been raised so that the pivoted connection is at broken-line position 52, the flaps are in a partial afterburning power position. When both the convergent and divergent flaps have been raised so that the pivoted connection is at broken-line position 54, the flaps are in a maximum afterburning power position.

Figure 2:
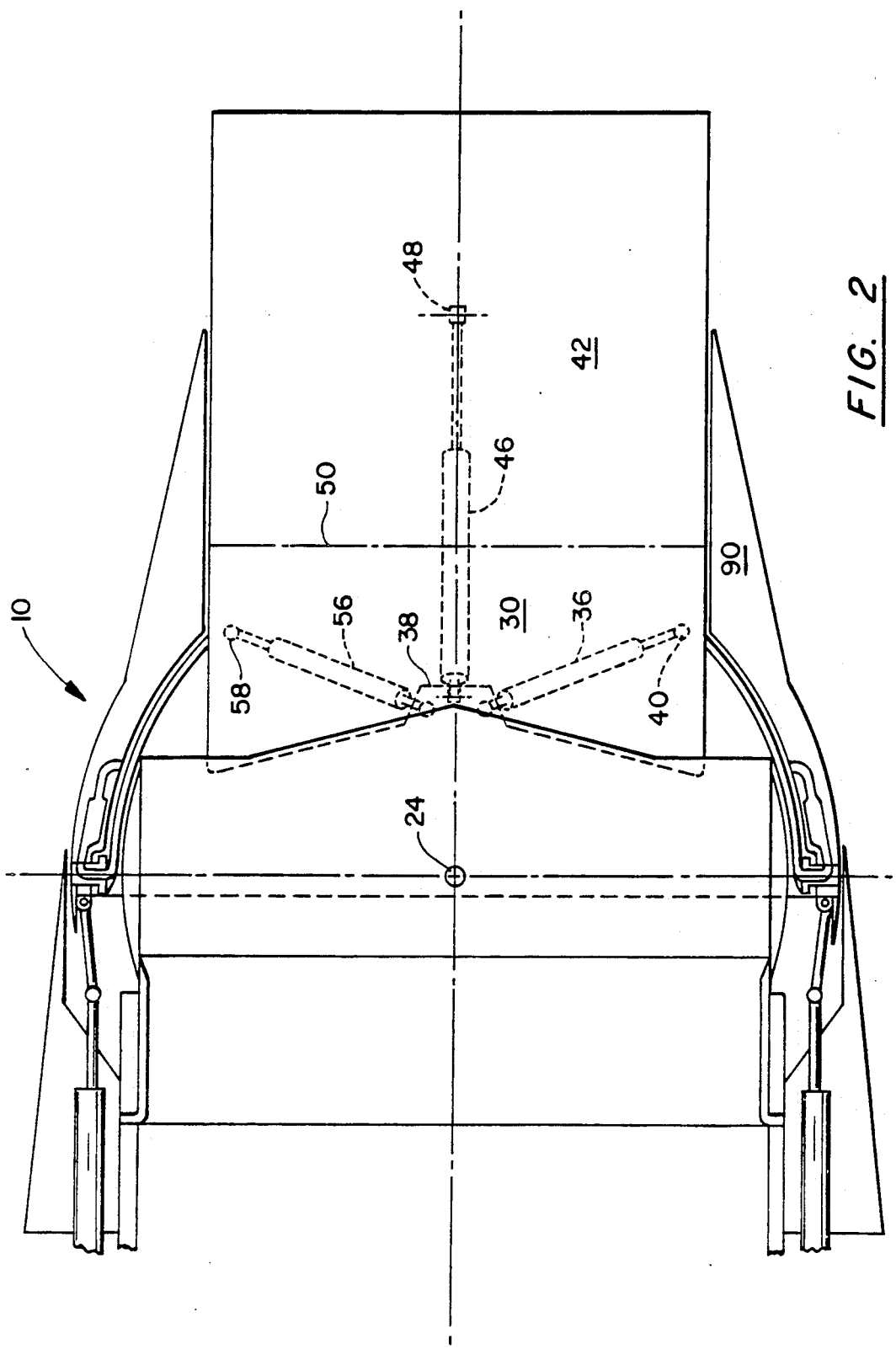
FIG. 2 is a top view of the exhaust nozzle of FIG. 1.
Figure 3:
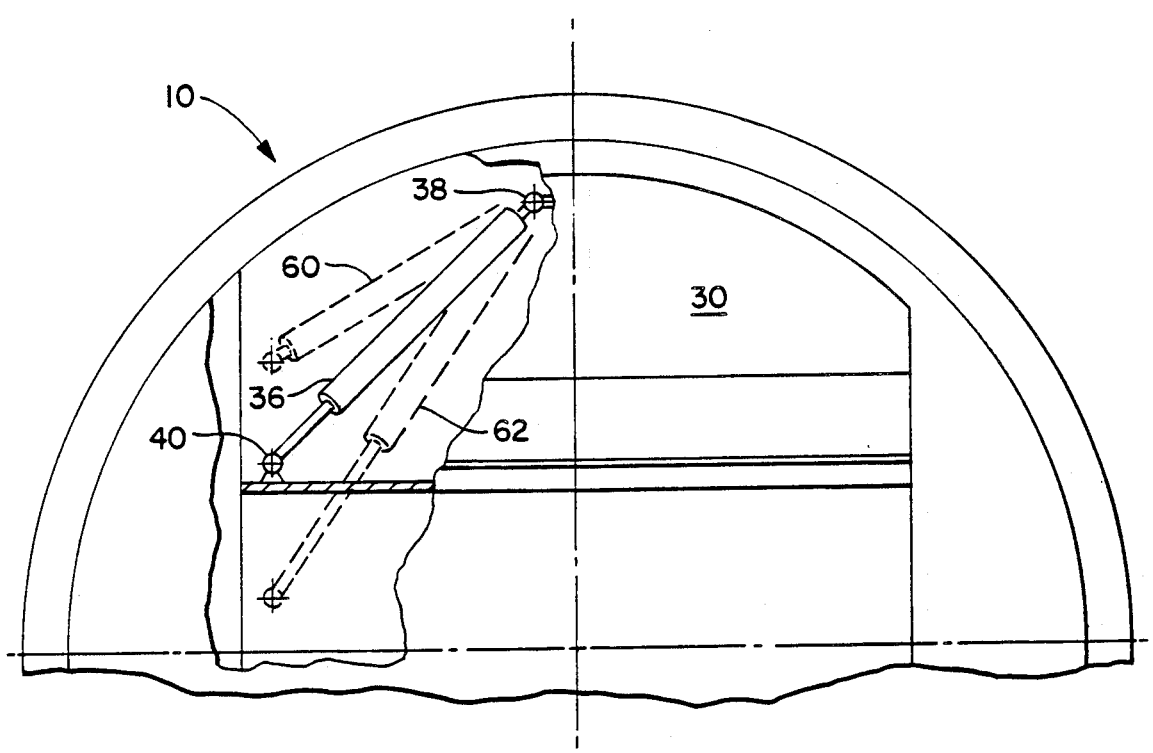
FIG. 3 is a rear view of the convergent nozzle showing its actuator configuration.

In the FIG. 2 showing of the top of engine 10, the connection of actuator 36 to gimbal structure 38 and the outer surface of converging flap 30 can be seen. Companion actuator 56 for upper convergent flap 30 also is shown. The upper end of this actuator is connected to gimbal structure 38 relatively close to the connection of actuator 36 and the other end of actuator 56 is connected to boss 58 on the outboard surface of flap 30 and opposite boss 40 on a horizontal and vertical plane. The included angle between actuators 36 and 56 is an obtuse angle. A pair of actuators would be similarly located for the lower convergent flap and connected to gimbal structure near the bottom of gimbal ring 22. Divergent actuator 46 is shown connected to the gimbal structure and divergent flap 42. In the FIG. 3 rear view showing, actuator 36 is in the sea level dry power position and its connection with gimbal structure 38 and convergent flap boss 40 can be seen. The upper broken-line actuator position 60 is the maximum afterburning power position, and the lower broken-line actuator position 62 is a reverse power position which the convergent flaps would be in a closed position.

Cooling air for the nozzle, as shown in FIG. 1, comes from afterburner liner 14 and is collected in plenum 64 surrounding collar 16. The cooling air flows from the plenum through duct 66 and the gimbal pivot into torus 68 from which it is distributed around to the sides of the nozzle and to the two pivoting hub areas of the convergent flaps. Cooling air is similarly supplied to the region of the second gimbal pivot on the lower part of the nozzle. This is shown in more detail in FIGS. 4 and 5.

Figure 4:
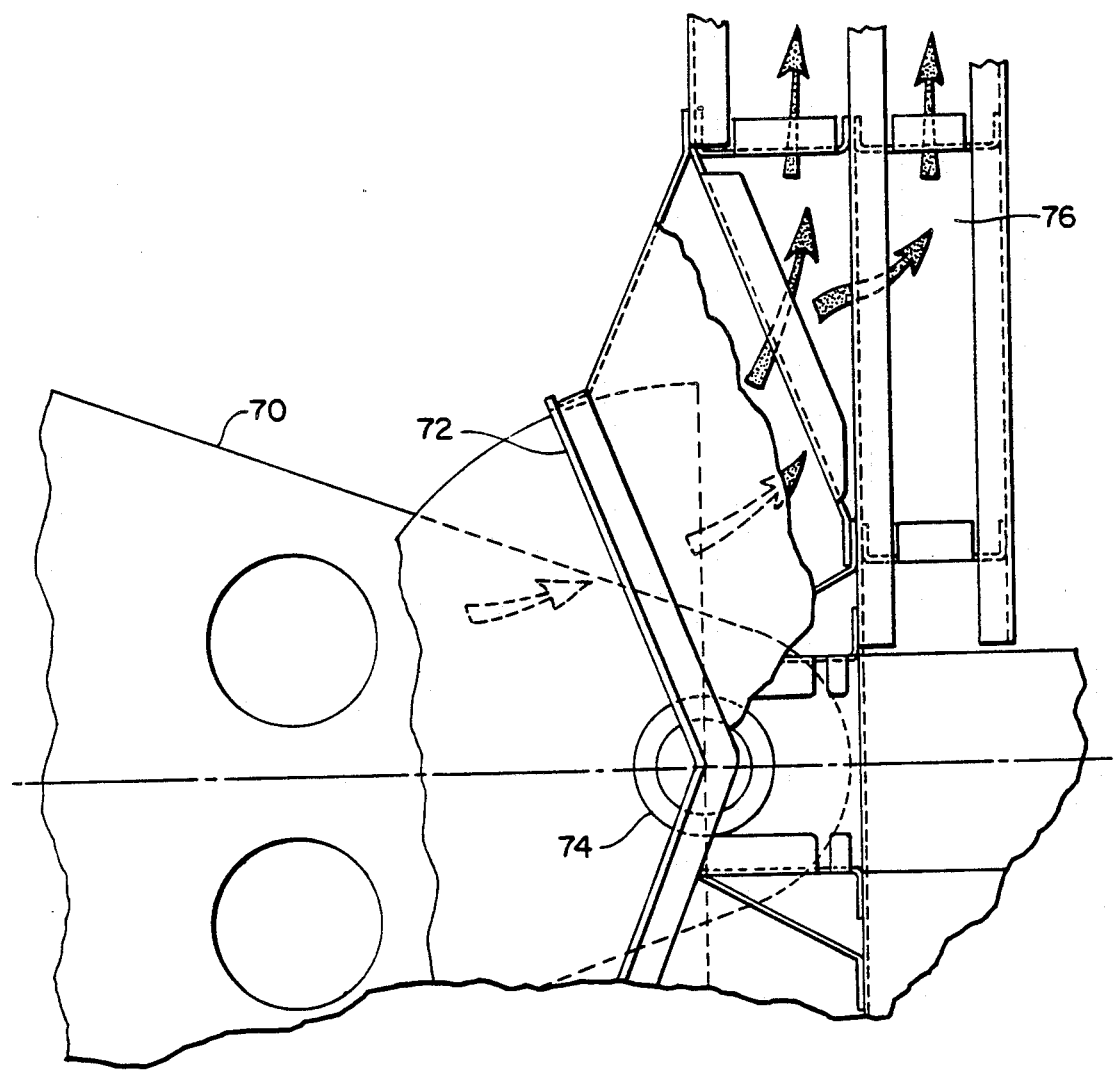
FIG. 4 is a top view of the yaw bearing showing the cooling air routing through the swivel duct.
Figure 5:
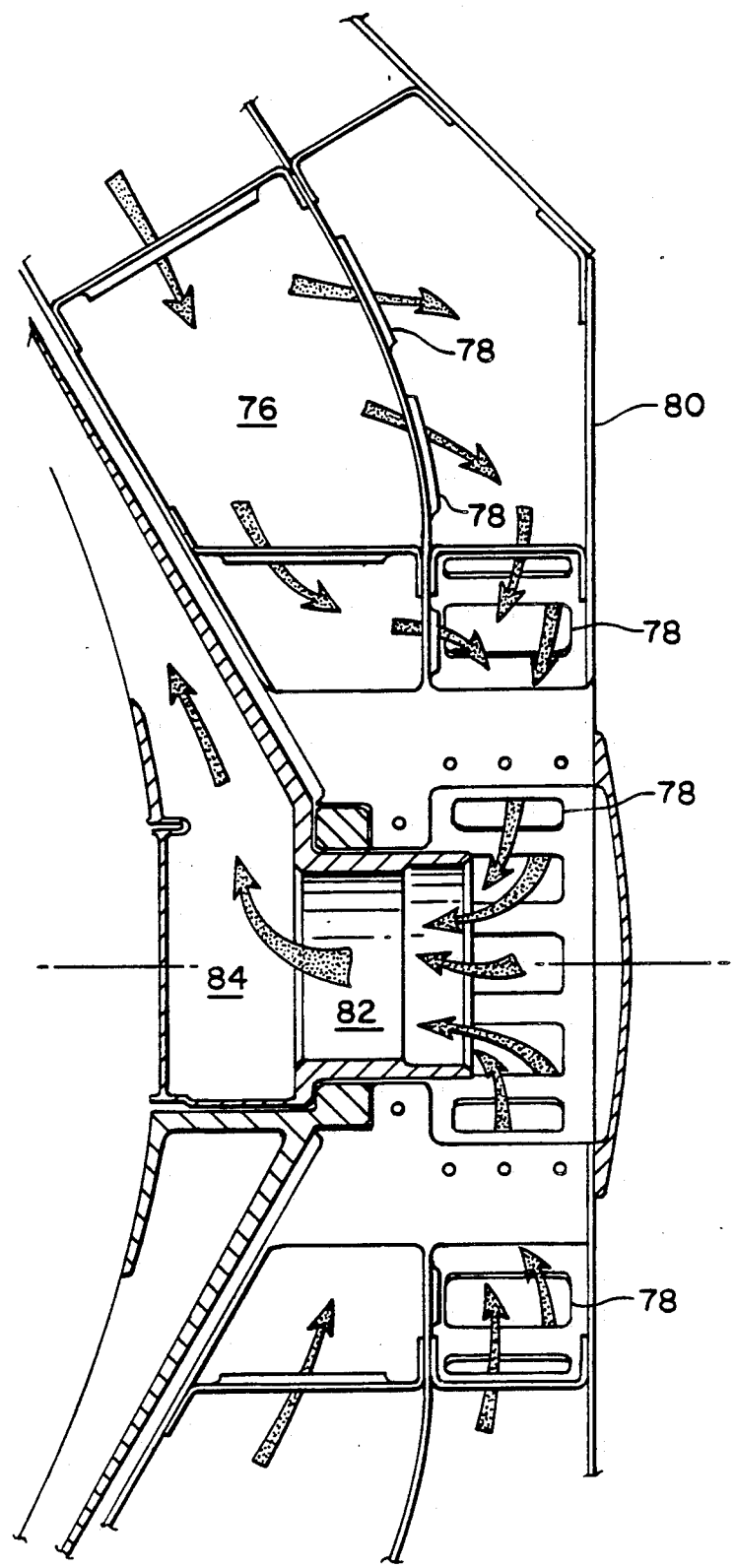
FIG. 5 is a side view through the hub area of the convergent flap showing the cooling air routing.
Figure 6:
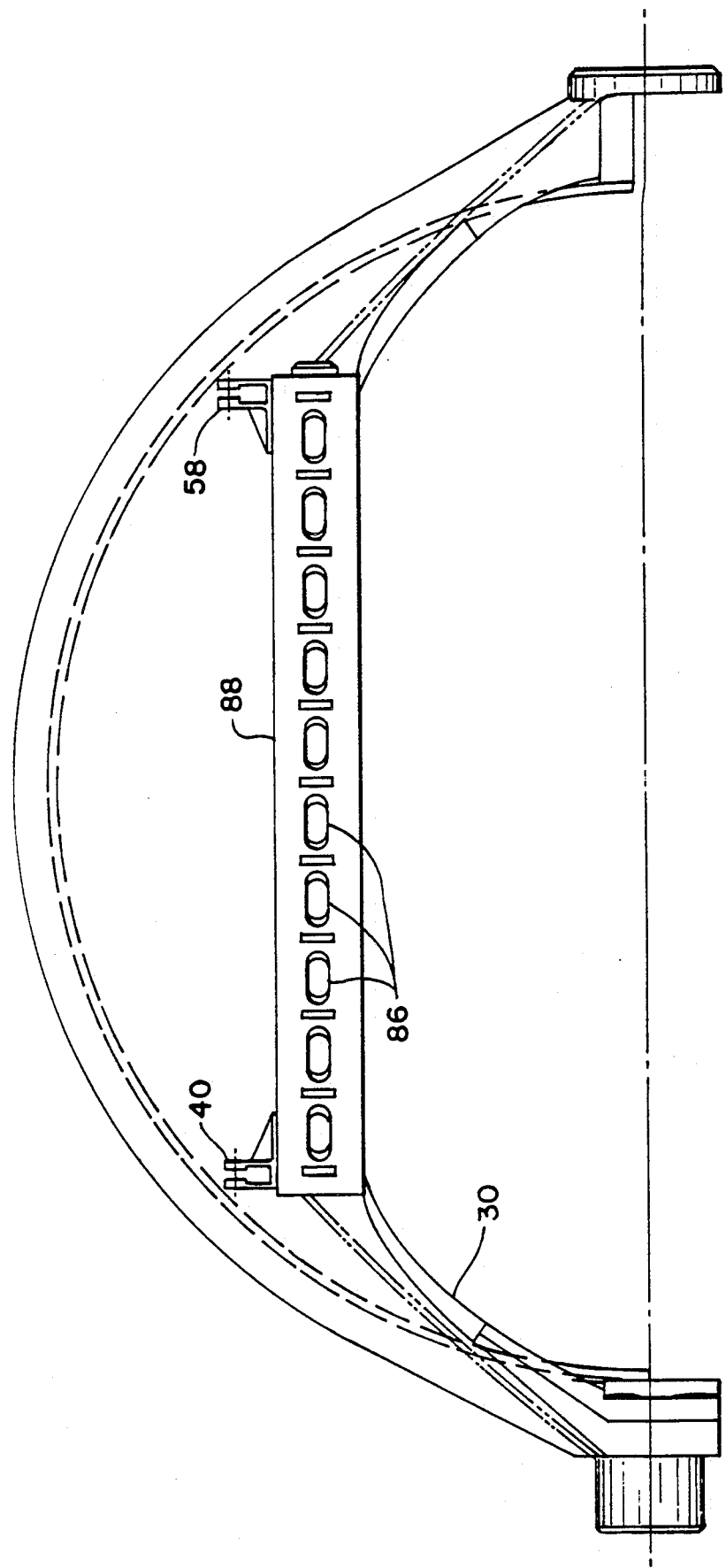
FIG. 6 is a rear view of the converging flap showing the cooling air holes.

FIG. 4 is a top view of the nozzle yaw structure showing the cooling air routing through the swivel duct. Air flows from plenum 64 of FIG. 1 through static structure 70 in FIG. 4 into swivel duct 72 which is part of the nozzle yaw structure supported by yaw bearing 74. Cooling air then flows from duct 7 into torus 76 surrounding the exhaust nozzle. In FIG. 5, the cooling air routing through the hub area of the exhaust nozzle is shown. The cooling airflow from torus 76 through openings 78 in nozzle casing static structure 80 into convergent nozzle hub 82. From here, the cooling air flows into the interior 84 of the convergent flaps. Cooling air exits from each convergent flap and flows into the divergent flaps through a series of openings along pivot connection 44, FIG. 1. FIG. 6, a rear view of upper converging flap 30, shows a series of cooling air holes 86 along discharge end hinge line edge 88 of the flaps where the flaps are connected to the divergent flaps. Bosses 40 and 58 for connection of the flap actuators, not shown, can be seen.

The actuation and cooling distribution system which has been described eliminates the need for a complex seal system at the junction of the convergent flaps and nozzle static structure, 90 in FIG. 2. Continuous contact seal 92, FIG. 1, at the upstream end of convergent flap 30 prevents hot gas leakage.

It is to be understood that the invention is not limited to the particular embodiment shown and described herein, but that various changes and modifications may be made without departing from the spirit or scope of this concept as defined by the following claims.

We claim:

1. A spherical exhaust nozzle for a gas turbine engine, said engine including an afterburner liner terminating in a fixed collar having a spherical external surface and a rearwardly facing opening for the discharge of exhaust gases, upper and lower converging flaps for varying the area of said opening, said flaps being mounted on a gimbal ring and having a common horizontal axis of rotation, said gimbal ring surrounding said fixed collar and having a vertical axis of rotation with respect to said fixed collar, and actuating means for rotating said converging flaps about their horizontal axis, said actuating means being connected at one end to gimbal ring structure and at the opposite end to the external surface of said converging flaps.

2. A spherical exhaust nozzle for a gas turbine engine in accordance with claim 1 in which said actuating means includes a pair of actuators connected to the upper converging flap and a pair of actuators connected to the lower converging flap.

3. A spherical exhaust nozzle for a gas turbine engine in accordance with claim 1 in which said actuating means includes a pair of actuators connected to each of said upper and lower converging flaps, one end of each actuator being connected to gimbal ring structure relatively close to each other, and the other end of each actuator being connected to the external surface of said converging flaps at relatively spaced locations.

4. A spherical exhaust nozzle for a gas turbine engine, said engine including an afterburner liner terminating in a fixed collar having a spherical external surface and a rearwardly facing opening for the discharge of exhaust gases, upper and lower converging flaps for varying the area of said opening, said flaps being mounted on a gimbal ring and having a common horizontal axis of rotation, said gimbal ring surrounding said fixed collar and having a vertical axis of rotation with respect to said fixed collar, actuating means for rotating said converging flaps about their horizontal axis, said actuating means being connected at one end to gimbal ring structure and at the opposite end to the external surface of said converging flaps and means for cooling said convergent flaps including torus means surrounding said fixed collar and adjacent said gimbal ring, means for providing cooling air to said torus means, means for ducting said cooling air through said torus to the horizontal rotational axis of said upper and lower converging flaps, hub means for each of said upper and lower converging flaps on said horizontal axis of rotation, means for the flow of cooling air therethrough, and means for conducting cooling air through said converging flaps and discharging it therefrom.

5. Cooling means for flaps for a spherical exhaust nozzle in accordance with claim 4 in which the convergent flaps have a hinged connection with divergent flaps and the means for discharging cooling air from said convergent flaps is along said hinged connection.

6. Cooling means for flaps for a spherical exhaust nozzle in accordance with claim 4 in which the cooling air torus is rotatable with said gimbal ring about said vertical axis.

7. A spherical exhaust nozzle for a gas turbine engine, said engine including an afterburner liner terminating in a fixed collar having a spherical external surface and a rearwardly facing opening for the discharge of exhaust gases, upper and lower converging flaps for varying the area of said opening, said flaps being mounted on a gimbal ring and having a common horizontal axis of rotation, said gimbal ring surrounding said fixed collar and having a vertical axis of rotation with respect to said fixed collar, actuating means for rotating said converging flaps about their horizontal axis, said actuating means being connected at one end to gimbal ring structure and at the opposite end to the external surface of said converging flaps and means for cooling said convergent flaps including torus means surrounding said fixed collar and adjacent to and rotatable with said gimbal ring, means for ducting said cooling air through said torus to the horizontal rotational axis of said upper and lower converging flaps, hub means for each of said upper and lower converging flaps on said horizontal axis of rotation, means for the flow of cooling air therethrough, means for the flow of cooling air through said converging flaps, said cooling flaps having a hinged connection with divergent flaps and means for the flow of cooling air from said convergent flaps through said hinged connection and into said divergent flaps.

* * * * *

UNITED STATES PATENT AND TRADEMARK OFFICE
CERTIFICATE OF CORRECTION

PATENT NO. : 4,993,641

DATED : February 19, 1991

INVENTOR(S) : DEBORA F. KEHRET ET AL

It is certified that error appears in the above-identified patent and that said Letters Patent is hereby corrected as shown below:

Col. 3, line 8, after "duct", "7" should be --72--

Signed and Sealed this

Twenty-ninth Day of September, 1992

Attest:

DOUGLAS B. COMER

Attesting Officer

Acting Commissioner of Patents and Trademarks